United States Patent [19]

Holzhauser

[11] Patent Number: 4,593,995

[45] Date of Patent: Jun. 10, 1986

[54] METHOD AND APPARATUS FOR PRODUCING MULTIPLE SETS OF COPIES OF A DOCUMENT

[75] Inventor: Ronald C. Holzhauser, Holley, N.Y.

[73] Assignee: Eastman Kodak Company, Rochester, N.Y.

[21] Appl. No.: 619,245

[22] Filed: Jun. 11, 1984

[51] Int. Cl.[4] .................... G03G 15/04; G03B 27/44

[52] U.S. Cl. .................................... 355/3 R; 355/46

[58] Field of Search .................... 355/3 R, 11, 23, 24, 355/26, 46

[56] References Cited

U.S. PATENT DOCUMENTS

| | | | |
|---|---|---|---|
| 3,672,765 | 6/1972 | Altmann | 355/24 |
| 3,690,756 | 9/1972 | Smith | 355/4 |
| 3,751,584 | 8/1973 | Pickering et al. | 355/20 X |
| 3,773,419 | 11/1973 | Sumner et al. | 355/46 X |
| 4,021,109 | 5/1977 | Tanaka et al. | 355/8 |
| 4,095,979 | 6/1978 | Di Francesco | 355/16 X |
| 4,116,558 | 9/1978 | Adamek | 355/24 |
| 4,162,848 | 7/1979 | Platt | 355/46 X |
| 4,176,945 | 12/1979 | Holzhauser et al. | 355/23 |
| 4,192,607 | 3/1980 | Hage | 355/50 |
| 4,264,183 | 4/1981 | Stoudt | 355/3 R |
| 4,289,377 | 9/1981 | Matsui et al. | 350/169 |
| 4,345,751 | 8/1982 | Holzhauser | 271/3.1 |
| 4,387,979 | 6/1983 | Ohishi et al. | 355/46 X |

OTHER PUBLICATIONS

*Research Disclosure*; Oct. 1981; pp. 384–386, Item No. 21024.

Research Disclosure 19015, p. 61, Feb. 1980, Published by: Kenneth Mason Publications Ltd.

*Primary Examiner*—Fred L. Braun

*Attorney, Agent, or Firm*—G. Herman Childress

[57] ABSTRACT

Multiple sets of copies are produced of a document made up of a plurality of document sheets having pages to be copied arranged in a predetermined order. The pages of the document sheets are presented at a position for copying, and each page of the document is illuminated once each time the page is presented for copying. An optical system provides a plurality of optical paths from a page being illuminated to a photoconductor so that duplicate latent images are formed on the photoconductor each time a page of the document sheet is illuminated. In this manner, the photoconductor receives a plurality of images of one page of the document followed by a plurality of images of a second page of the document. The latent images are developed and transferred to copy sheets, and the resulting duplicate copy sheets are collected at a plurality of stations. Duplicate copy sheets are directed to different stations so that the stations each receive a set of copies of the document.

1 Claim, 2 Drawing Figures

METHOD AND APPARATUS FOR PRODUCING MULTIPLE SETS OF COPIES OF A DOCUMENT

BACKGROUND OF THE INVENTION

The present invention relates to method and apparatus for producing a plurality of sets of copies of a mlulti-sheet document each time the sheets of the document are circulated seriatim to an exposure position.

U.S. Pat. No. 4,176,945, which issued on Dec. 4, 1979 in the names of R. C. Holzhauser et al, discloses a copier/duplicator with a recirculating feeder for receiving a set of document sheets and circulating the document sheets seriatim to a platen. A document sheet at the platen is illuminated to form a latent image of a page of the document sheet on a photoconductor. The latent image is developed, transferred to a copy sheet and fused to the copy sheet to form a copy of the page of the document sheet. Document sheets fed by the recirculating feeder can be either simplex document sheets or duplex document sheets. A simplex document sheet has information to be copied only on one side or face of the document sheet, and a duplex document sheet has information to be copied on both sides or faces of the document sheet. When duplex document sheets are to be copied, the copier duplicator forms on the photoconductor two adjacent latent images of opposite sides of the duplex document sheet. The latent images are developed. One such developed image is transferred to one side of the copy sheet and then the copy sheet is inverted and the second developed image is immediately transferred to the second side of the copy sheet. After fusing, the copy sheets are stacked in the same order as the document sheets in the feeder. Such apparatus has proved to be successful for forming one set of copy sheets each time a set of document sheets is circulated seriatim to an exposure platen for illumination and copying.

A copier/duplicator as described above is quite desireable because the copies produced can be collected in a tray with the copy sets arranged in the same page sequence as the pages of the original document. Such eliminates the need for a collator as an accessory to the copier/duplicator. However, the sheets of the document normally are circulated to the platen at the same rate copies are produced by the copier/duplicator. Copier/duplicators may produce copies at high rates, e.g., approximately 4,000 to 8,000 copies per hour. Thus very little time is available for removing one page of a document sheet from a platen, then feeding a second page of the document sheet or a second sheet to the platen and registering it for copying without reducing the maximum rate of copying of the copier/duplicator. The need to circulate document sheets in a recirculating feeder at rates equal to the high rates copies are produced increases the possibility that document sheets may be damaged, misfeeding of sheets may occur, sheets are not properly registered for copying, etc. Thus the need to circulate the document sheets at high rates can be a difficult problem and may limit the maximum rate at which copies can be produced by a copier/duplicator when document sheets are being handled by a recirculating feeder.

SUMMARY OF THE INVENTION

In accordance with the present invention apparatus is provided for reproducing a document comprising a plurality of sheets having information bearing pages arranged in a predetermined page sequential order. The apparatus includes a photoconductor for receiving a latent image of a page of the document, and means for developing such an image, transferring a developed image to a copy sheet, and fixing the image on the copy sheet. A recirculating feeder presents the pages of the document sheets seriatim a plurality of times at a position for copying. Means are provided for reflecting light rays off of a page of the document at the copying position once each time the page is presented for copying. An optical system comprising lens means and a beam splitter is located with respect to the copying position and the photoconductor to form a plurality of duplicate latent images adjacent each other on the photoconductor each time a page of a document sheet is illuminated at the copying position so that the photoconductor receives a plurality of images of one page of the document followed by a plurality of images of another page of the document until all pages of the document are copied. Means are provided for collecting copy sheets containing images of pages of the document. The collecting means comprises a plurality of stations, and means for directing copy sheets containing duplicate images to different stations.

In accordance with the invention a method is provided for producing sets of copies of a document comprising a plurality of sheets having pages to be copied arranged in a predetermined order. The method comprises the steps of presenting the pages of the document sheets seriatim at a position for copying, and illuminating a page of the document once each time the page is presented for copying. A plurality of duplicate images are formed each time a page of the document is illuminated, and such images are formed on successive copy sheets so that a plurality of copies of one page of the document are produced followed by a plurality of copies of a second page of a document. The method further comprises collecting the copy sheets containing images of pages of the document at a plurality of stations with copy sheets containing duplicate images being collected at different stations.

The invention and its advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Figure 1:
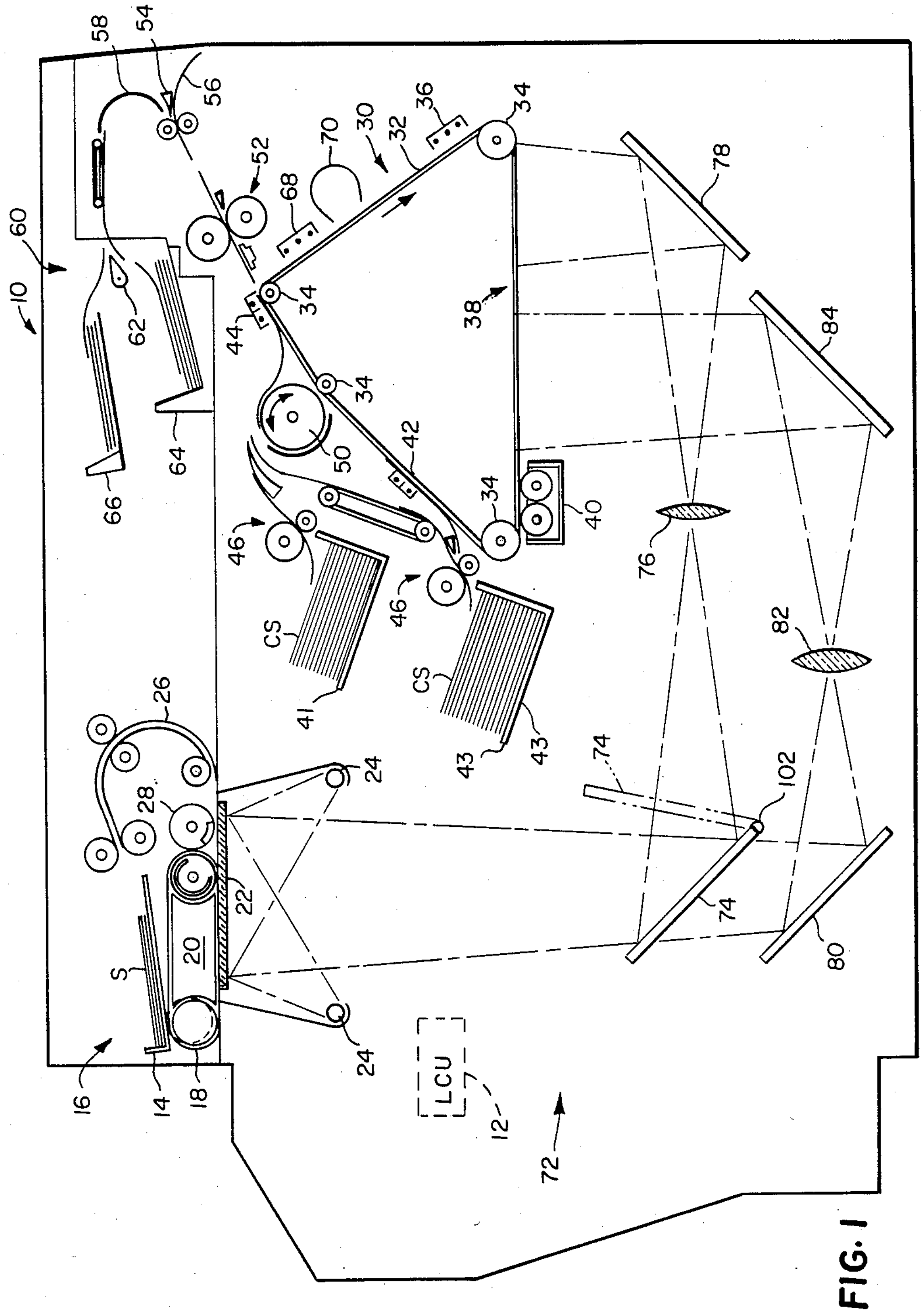
FIG. 1 is a generally schematic view illustrating one preferred embodiment of the apparatus of the present invention.

Referring now to FIG. 1 of the drawings, copier/duplicator apparatus is generally designated 10 and comprises a logic and control unit (LCU) 12 which monitors and controls various elements of the apparatus. Apparatus 10 can make sets of copies of an original document comprising a plurality of document sheets S which are supplied to the apparatus by placing them in a tray 14 of a recirculating document feeder generally designated 16. Recirculating feeders for use with copier/duplicators are well known in the art. Feeder 16 may, for example, be a recirculating feeder of the type disclosed in the commonly assigned U.S. Pat. No. 4,345,751 which issued on Aug. 24, 1982 in the name of R. C. Holzhauser, the disclosure of which is incorporated herein by reference. Generally, the sheets S forming the document are placed in the tray in their normal page sequence order with the upper side of the top sheet comprising the first page of the document and with the last page of the document being on the bottom sheet of the stack. With simplex document sheets, the information to be copied faces upwardly on all sheets and the sheets are removed seriatim beginning with the bottommost sheet in the stack and fed around a feed roller 18 to a sheet transport 20 for delivery to a platen 22. With the document sheet properly registered on the platen, the document page is illuminated by flash lamps 24 so that the document page is copied as explained in more detail hereinafter. Then the simplex document sheet is fed through a return path 26 leading back to the top of a stack of document sheets in tray 14.

When duplex document sheets S are provided in tray 14, it is necessary to copy both sides of the document sheets and, preferably the copying occurs in page sequence order beginning with the last page of the document and ending with the first page of the document. In order to copy in this sequence a sheet S is removed from tray 14, fed around roller 18 and across the platen 22 initially without stopping the document sheet for copying. Then the document sheet is deflected around the turnaround roller 28 in a clockwise direction and returned to the platen 22 for copying. During such movement the document sheet is inverted twice, i.e., once as it travels around roller 18 and the second time as it travels around roller 28. Thus the side of the document sheet facing downwardly on platen 22 for copying is the same side that initially faces downwardly in the tray 14. The side of the sheet initially facing downwardly in tray 14 is normally an even numbered page of the document. After lamps 24 illuminate the document for copying, the document sheet is again fed around turnaround roller 28 and returned to the platen so that the second (odd page numbered) side of the document sheet can be positioned on the platen and illuminated for copying. Then the document sheet is fed through return path 26 back to the top of the stack of sheets S. This procedure continues until each page of the document sheet is copied seriatim by presenting first one side of a document sheet and then the other side of the document sheet, followed by copying both sides or pages of each of the other document sheets.

The copier/duplicator apparatus 10 has a process section generally designated 30 which is adapted to receive an image of a page presented at platen 22 and to produce a copy of such a page. The process section includes a flexible photoconductor 32 that is trained around a series of rollers 34, at least one of which is driven to move a plurality of image frames on the photoconductor past a series of work stations for development of the image of the document sheet. The various work stations may include a charging station 36 at which the photoconductor is sensitized by receiving a uniform electrostatic charge. The charged photoconductor is then moved through an exposing station 38 at which the photoconductor receives an image of a light pattern of the document page on platen 22. The exposing station 38 is larger than the usual exposing station. The light pattern selectively discharges the electrostatic charge to form a latent image of a document page on the photoconductor. Then the photoconductor passes through a developing station 40 where toner particles are applied to the latent electrostatic image to develop the image.

The developed image is transported past two image transfer stations 42 and 44 where a developed image is transferred to one or both sides of a copy sheet. Copy sheets CS are provided at two separate sheet supplies 41 and 43 and can be fed from either supply to the transfer stations for receiving images by transport mechanisms generally designated 46. When duplex copy sheets are to be formed, copy sheets CS are fed from the lower supply 43 to a position alongside the photoconductor between developing station 40 and the first image transfer station 42 so that a developed image from one side of the document sheet is transferred to one side of the copy sheet. Then the copy sheet is transported with the photoconductor to a turnover drum 50 where the drum picks up the copy sheet and moves it initially in a counterclockwise direction as viewed in FIG. 1 until the trailing edge of the copy sheet is removed from the photoconductor. At the appropriate time in the cycle, the direction of the drum 50 is reversed to return the copy sheet to the photoconductor with the previously applied image then being on the upper side of the sheet (away from the photoconductor). Then the sheet is transported beneath the second transfer station 44 where a second developed image on the photoconductor is applied to the second side of the copy sheet. The copy sheet with the two images thereon then passes through a fusing station 52 which adheres the developed images to the copy sheet.

The copy sheet can then be transported along either of two sheet paths, depending upon the position of a diverter 54. When the diverter is in one position the sheet is transported along a path designated 56 which can, for example, lead to a finishing apparatus. When the diverter 54 is in the other position, the sheet is transported along a sheet path generally designated 58 to collecting means 60 for the copy sheets. As the sheets travel along path 58 they encounter another diverter 62 which is effective to direct the copy sheets into either of a plurality of collection stations of the collecting means 60. More specifically, diverter 62 is located with respect to path 58 to direct copy sheets either to a tray 64 comprising one station of the collecting means or into a tray 66 comprising another station of the collecting means.

When only simplex copies are to be produced, copy sheets CS can be fed from the upper supply 41 or lower supply 43 of copy sheets along a path extending above the turnover drum 50 and to the photoconductor between the turnover drum and the second transfer station 44. In this instance only one developed image will be transferred to the copy sheet and fused thereto by fuser 52. The copy sheet is delivered along either path 56, or along path 58 to the collecting means 60.

After the photoconductor passes transfer station 44 it travels beneath a discharging device 68 and other cleaning apparatus 70 so that the photoconductor is conditioned for reuse.

When lamps 24 illuminate a page of a document on platen 22, an image of that page is provided to the exposing station 38 by an optical system generally designated 72. Optical system 72 comprises a beam splitter 74 which is located with respect to platen 22 to receive rays of light reflected off of the page of the document on the platen. Some of the light rays striking the beam splitter 72 are reflected by the beam splitter through a first lens 76 onto a plane mirror 78 and then reflected by mirror 78 onto the bottom surface of photoconductor 32 in the area of the exposing station 38. Other portions of the light rays reflected from the page on platen 22 pass through the beam splitter 74 and strike a second plane mirror 80. Light rays striking mirror 80 are reflected by the mirror through a second lens 82 and strike a third plane mirror 84. Mirror 84, in turn, reflects the rays onto the lower surface of photoconductor 32 in the exposing station 38.

The various elements of the optical system 72 are arranged so that the two path lengths for light rays from the sheet on platen 22 to the photoconductor along the optical axes are the same. Lens 76, 82 can be focused individually so that both images at exposure station 38 are in focus. The lens 76, 82 can be zoom lens and adjusted simultaneously or individually to vary the size of the images formed on the photoconductor. The elements of the optical system are located so that the resulting pair of duplicate latent images formed on photoconductor 32 are sequentially arranged on adjacent frames of the photoconductor. In other words, the image formed by rays reflected from mirror 84 is adjacent to and beside the image formed by rays reflected from mirror 78.

Thus each time lamps 24 are flashed to illuminate a page on the platen 22 two identical duplicate latent images of that page of the document sheet are formed on the photoconductor. As that page of the document is removed, replaced by a new page and illuminated by lamps 24, two duplicate latent images of the new page are formed on the following portion of the photoconductor. In this manner the photoconductor receives a plurality of images of one page of the document followed by a plurality of images of another page of the document. This process continues until all pages of the document have been illuminated to form pairs of duplicate images on the photoconductor each time a page of the document is illuminated by lamps 24.

When images are to be copied on only one side of the copy sheets CS, the copy sheets are fed from either paper supply along the sheet path leading to the left and above the turnover drum 50 and then into the area between the photoconductor and the second transfer station 44. One copy sheet receives the first or leading one of the developed duplicate images of the page on the photoconductor and the next following copy sheet receives the second or trailing one of the developed duplicate images of the page on the photoconductor. The images are fused to the copy sheets CS in the fusing station 52. Assuming diverter 54 is located in its lower position, the copy sheets travel along path 58 toward the collecting means 60. As the sheets reach the collecting means, diverter 62 shifts between its two operating positions so that it deflects one of the duplicate copy sheets of each pair into collecting tray 64 and the other copy sheet of the pair into the other tray 66. Thus after each page of the document has been presented to platen 22 and illuminated once by the lamps 24, two complete sets of copies of the document have been produced and are available to the machine operator in trays 64 and 66. Each set of copy sheets is in the same page sequence order as the original document sheets S in tray 14.

When the copy sheets CS are to receive images on both sides or faces of the copy sheets (duplex copy sheets) the copy sheets CS are fed from the lower sheet supply 43 along the sheet path leading into the area between the photoconductor 32 and the first transfer station 42. As the sheet passes beneath the transfer station 42 one of the pair of developed duplicate images on the photoconductor is transferred to one side of the copy sheet. Then as the copy sheet reaches the turnover drum 50 it is picked up by the drum and moved in a counterclockwise direction as viewed in FIG. 1 until it is completely removed from the photoconductor. Similarly, the next copy sheet is fed in the same manner and the second image of the pair of developed duplicate images is transferred to one side of the second copy sheet. In like fashion the second copy sheet reaches the turnover drum 50, is picked up by the turnover drum and moved in a counterclockwise direction until the trailing edge of the second copy sheet of the pair is lifted off of the photoconductor 32. At that time the two duplicate copy sheets are being held by the turnover drum 50. Then the turnover drum 50 immediately reverses its direction (from counter-clockwise to clockwise) and delivers first the second copy sheet of the pair and then the first copy sheet of the pair back to the photoconductor for transport beneath the second transfer station 44. As the two sheets sequentially pass beneath the transfer station 44 each sheet receives one of the developed images of the next pair of duplicate images on the photoconductor so that when the two sheets leave the transfer station 44 each sheet contains two pages of information and both sheets are duplicates of each other. The duplex copy sheets then pass through the fusing station 52, are diverted along one of the paths 56 and 58. Assuming again that the sheets are delivered along path 58, diverter 62 is effective to direct one of the pair of copy sheets into tray 64 and the other of the pair of copy sheets into tray 66. Again, the process continues until all pages of the document sheets S have been presented to the platen 22 once to form two complete copy sets in trays 64 and 66.

When the duplicate copy sheets are directed along path 56 by diverter 54, the sheets can be alternately delivered to two finishing stations to form finished booklets. Alternatively, the sheets can be delivered to trays of a collator, or to other apparatus for collecting the sheets.

Figure 2:
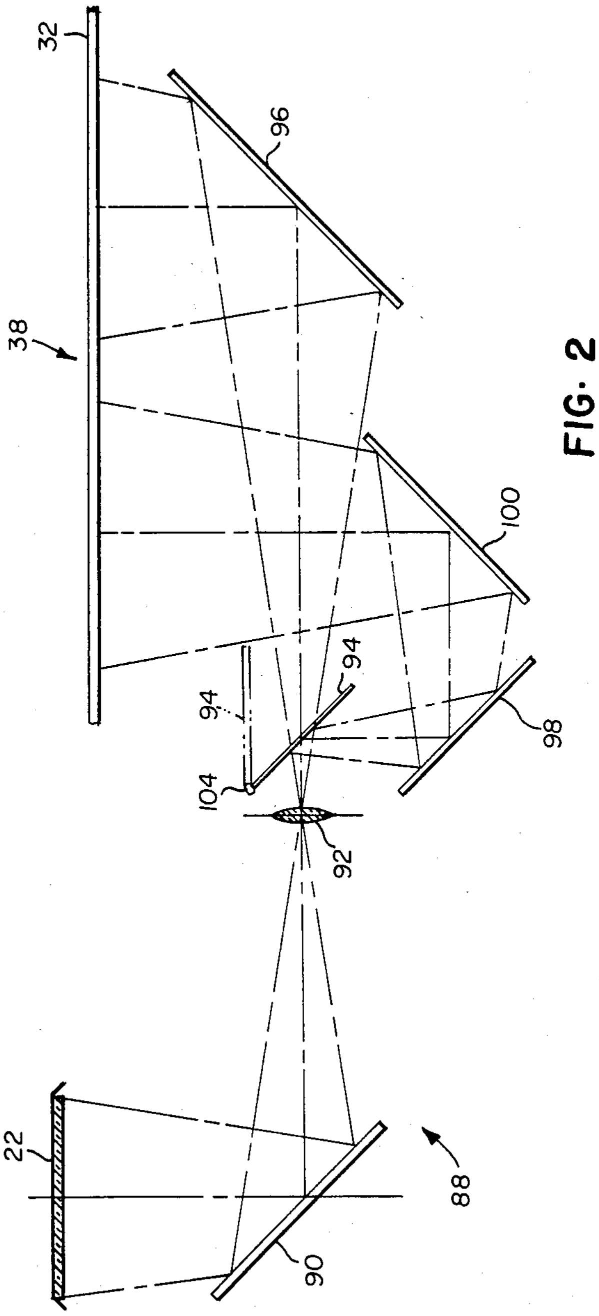
FIG. 2 is a fragmentary schematic view illustrating a second embodiment of the present invention.

FIG. 2 of the drawings illustrates another embodiment of an optical system 88 for simultaneously forming a plurality of duplicate latent images on a photoconductor. In FIG. 2 a light of a page presented at platen 22 is reflected by a first plane mirror 90 through a single lens 92 to a beam splitter 94. Part of the light rays striking beam splitter 94 pass directly through the beam splitter and are reflected by a second plane mirror 96 to the photoconductor 32 in the area of the exposure station 38. Other portions of the light rays striking beam splitter 94 are reflected to a third plane mirror 98 and then to a fourth plane mirror 100 which reflects a second image of the page on platen 22 to photoconductor 32 in the area of the exposure station 38. Thus, two duplicate latent images are formed on the photoconductor 32 each time a page of a document on platen 22 is exposed by the lamps 24. This is accomplished in the FIG. 2 embodiment by using only a single lens 92 with the beam splitter being between the lens and the photoconductor 32 as compared to the first embodiment wherein two separate lenses are used and wherein the beam splitter is located between the document and the lenses. Substitution of the optical system 88 shown in FIG. 2 for the system 72 of FIG. 1 can be used to produce simplex or duplex copy sheets in the same manner as explained hereinbefore in connection with FIG. 1.

The elements of optical system 88 are arranged so that the two path lengths for light rays from the platen to the photoconductor along the optical axes are equal. Lens 92 can be a zoom lens and adjusted to vary the size of the images formed in the photoconductor.

In some instances it may be desireable to form only a single image of a document page presented at platen 22, as occurs with prior copier/duplicators. Such also is desireable when an odd number of sets of copies is to be produced. This can be accomplished by swinging the beam splitter 74 about a hinge 102 to its dotted line position. Similarly, beam splitter 94 can be swung about hinge 104 to its dotted line position.

If desired, a document sheet at platen 22 can be illuminated by an optical or laser scanning system instead of flash lamps 24. Also, the document sheet could be scanned, the image converted to electronic signals, and the resulting signals used to simultaneously provide duplicate images on the photoconductor.

A number of advantages are achieved by the invention. Since two images are formed on the photoconductor each time a document sheet is illuminated, the document sheets can be delivered by the recirculating feeder to the platen for copying at substantially half the rate that copies are produced. This increases the time available for the recirculating feeder to perform its operations, reduces the speed at which document sheets must be handled, and reduces the possibility that document sheets may be misfed, not properly registered, or may be damaged during circulation. Also, for a recirculating feeder operation at a particular circulation rate, the output of the associated copier/duplication can be substantially increased.

While the invention has been described in detail with particular reference to preferred embodiments thereof, it will be understood that variations and modifications can be effected within the spirit and scope of the invention as described hereinabove and as defined in the appended claims.

I claim:

1. In apparatus for producing sets of copies of a multipage document comprising a plurality of sheets having pages to be copied arranged in a predetermined page sequential order, the apparatus including a photoconductor for receiving a latent image of a page of the document, means for developing such an image, means for transferring a developed image to a copy sheet, and means for fixinig the image on the copy sheet, the improvement comprising:

a recirculating feeder for presenting the pages of the document sheets seriatim a plurality of times at a position for copying;

means for reflecting light rays off of a page of the document at the copying position once each time the page is presented for copying;

an optical system comprising a beam splitter, a mirror and a pair of lenses, the beam splitter being located relative to the lenses and the mirror to (1) reflect some of the rays of light from a page at the copying position to a first one of the lenses and (2) transmit other rays of light from a page at the copying position to the mirror for reflection by such mirror to a second one of the lenses, the optical system being located with respect to the copying position and the photoconductor to form a plurality of duplicate latent images adjacent each other on the photoconductor each time a page of a document sheet is illuminated at the copying position so that the photoconductor receives a plurality of images of one page of the document followed by a plurality of images of another page of the document until all pages of the document are copied; and means for collecting copy sheets containing images of pages of the document, the collecting means comprising a plurality of stations and means for directing copy sheets containing duplicate images to different stations.

* * * * *